(12) United States Patent
Sambrook

(10) Patent No.: US 9,987,625 B2
(45) Date of Patent: Jun. 5, 2018

(54) DESULFURIZATION AGENT

(71) Applicant: M-I Drilling Fluids UK Limited, Aberdeen (GB)

(72) Inventor: Rodney Martin Sambrook, Chesterfield (GB)

(73) Assignee: M-I Drilling Fluids UK Limited, Aberdeen (GB)

( * ) Notice: Subject to any disclaimer, the term of this patent is extended or adjusted under 35 U.S.C. 154(b) by 298 days.

(21) Appl. No.: 14/932,716

(22) Filed: Nov. 4, 2015

(65) Prior Publication Data

US 2016/0051974 A1 Feb. 25, 2016

Related U.S. Application Data

(60) Continuation of application No. 14/493,987, filed on Sep. 23, 2014, now Pat. No. 9,205,367, which is a division of application No. 12/443,885, filed as application No. PCT/GB2007/003744 on Oct. 2, 2007, now Pat. No. 8,871,675.

(30) Foreign Application Priority Data

Oct. 2, 2006 (GB) .................................. 0619396.5

(51) Int. Cl.
| | | |
|---|---|---|
| *B01J 2/02* | (2006.01) | |
| *B01J 31/32* | (2006.01) | |
| *B01D 53/48* | (2006.01) | |
| *B01D 53/52* | (2006.01) | |
| *B01J 20/02* | (2006.01) | |
| *B01J 20/06* | (2006.01) | |
| *B01J 20/28* | (2006.01) | |
| *B01J 20/30* | (2006.01) | |
| *C10G 25/00* | (2006.01) | |
| *B01D 53/04* | (2006.01) | |
| *B01J 20/26* | (2006.01) | |

(52) U.S. Cl.
CPC ............. *B01J 31/32* (2013.01); *B01D 53/04* (2013.01); *B01D 53/485* (2013.01); *B01D 53/52* (2013.01); *B01J 20/02* (2013.01); *B01J 20/0222* (2013.01); *B01J 20/0229* (2013.01); *B01J 20/0237* (2013.01); *B01J 20/0244* (2013.01); *B01J 20/0277* (2013.01); *B01J 20/06* (2013.01); *B01J 20/26* (2013.01); *B01J 20/2803* (2013.01); *B01J 20/28026* (2013.01); *B01J 20/28054* (2013.01); *B01J 20/28085* (2013.01); *B01J 20/30* (2013.01); *B01J 20/305* (2013.01); *B01J 20/3007* (2013.01); *B01J 20/3028* (2013.01); *B01J 20/3042* (2013.01); *B01J 20/3064* (2013.01); *B01J 20/3078* (2013.01); *C10G 25/003* (2013.01); *B01D 2253/112* (2013.01); *B01D 2253/1124* (2013.01); *B01D 2256/24* (2013.01); *B01D 2257/10* (2013.01); *B01J 2220/42* (2013.01); *C10G 2300/201* (2013.01); *Y10S 502/526* (2013.01)

(58) Field of Classification Search
CPC ............. B01J 20/02; B01J 20/06; B01J 20/30
USPC ....................................................... 502/439
See application file for complete search history.

(56) References Cited

U.S. PATENT DOCUMENTS

| | | | |
|---|---|---|---|
| 5,750,026 A | 5/1998 | Gadkaree et al. | |
| 5,998,328 A | 12/1999 | Dawes et al. | |
| 6,468,942 B1 | 10/2002 | Sansalone | |
| 8,871,675 B2 * | 10/2014 | Sambrook | ............ B01D 53/485 |
| | | | 502/406 |
| 9,205,367 B2 | 12/2015 | Sambrook | |

FOREIGN PATENT DOCUMENTS

| | | |
|---|---|---|
| CA | 2665190 C | 11/2016 |
| GB | 1504059 A | 3/1978 |
| WO | 1998/17373 A1 | 4/1998 |
| WO | 1998/17374 A1 | 4/1998 |
| WO | 2001/70907 A1 | 9/2001 |
| WO | 2001/79139 A1 | 10/2001 |
| WO | 2004/108273 A1 | 12/2004 |
| WO | 2006/027593 A2 | 3/2006 |
| WO | 2007/033083 A2 | 3/2007 |
| WO | 2008/040966 A1 | 4/2008 |

OTHER PUBLICATIONS

International Search Report for the equivalent International patent application PCT/GB2007/003744 dated Feb. 12, 2008.
International Preliminary Report on Patentability and Written Opinion for the equivalent International patent application PCT/GB2007/003744 dated Apr. 7, 2009.
Examination Report for the equivalent UK patent application 0719210.7 dated Oct. 6, 2009.
Examination Report for the equivalent Australian patent application 2007304053 dated May 20, 2011.
Office Action for the equivalent Norwegian patent application 20091756 dated Jul. 24, 2017.
Office Action for the equivalent Brazilian patent application PI0719977-5 dated Oct. 9, 2017.

* cited by examiner

*Primary Examiner* — Edward Johnson
(74) *Attorney, Agent, or Firm* — David J. Smith

(57) ABSTRACT

The present disclosure is directed to a desulphurization agent for removing sulphurous species from a diluent or process stream, and a use of such agent. In some examples, the agent may include a compound of manganese, pore forming particles and a compound of copper. The agent may be introduced into or mixed with the diluent or process stream to effectuate removal of sulphurous species from the diluent or process stream.

17 Claims, 2 Drawing Sheets

DESULFURIZATION AGENT

CROSS-REFERENCE TO RELATED APPLICATIONS

This continuation application claims priority to U.S. patent application Ser. No. 14/493,987, filed Sep. 23, 2014, which is a divisional application of U.S. patent application Ser. No. 12/443,885, filed Oct. 8, 2009, which is a 35 U.S.C. § 371 patent application claiming priority to PCT/GB2007/003744, filed on Oct. 2, 2007, which claims priority to U.K. patent application 0619396.5, filed Oct. 2, 2006, the disclosures of which are incorporated herein by reference in their entirety.

BACKGROUND

This invention relates to porous articles and specifically porous articles with controlled macro porosity which are usable to remove unwanted or required species from process streams or diluents.

It is known that process streams or diluents may contain either unwanted or required species which have to be removed from the process stream or diluent. For example, natural gas can contain compounds of mercury and/or arsenic and it is often necessary to cause desulphurisation of gas and/or liquid streams.

WO 98/17374 (the entire disclosure of which is herein incorporated by reference) discloses a desulphurisation agent which comprises at least one compound of manganese and at least one compound of iron. The agent may be in the form of shaped particles which may be porous with a pore volume of from 0.1 to 0.6 ml/g. Sorption materials such as copper compounds and/or zinc compounds may be provided on the surface or within the pores of the agent or within the bulk phase.

It is an object of this invention to provide a porous article which has controlled macro porosity and which can have adsorbents and/or catalytic species applied thereto or loaded therein for the processing of diluents or process streams.

It has been found that by controlling the macro porosity in this context the effectiveness of such porous articles is enhanced.

SUMMARY

According to a first aspect of the invention, there is provided a method of forming an agent for removing or separating a species from a diluent or process stream, e.g. a desulphurisation agent, the method comprising mixing the following:
  at least one compound of manganese;
  preferably at least one compound of iron and/or copper and/or zinc;
  pore forming particles.

DETAILED DESCRIPTION

Figure 1:
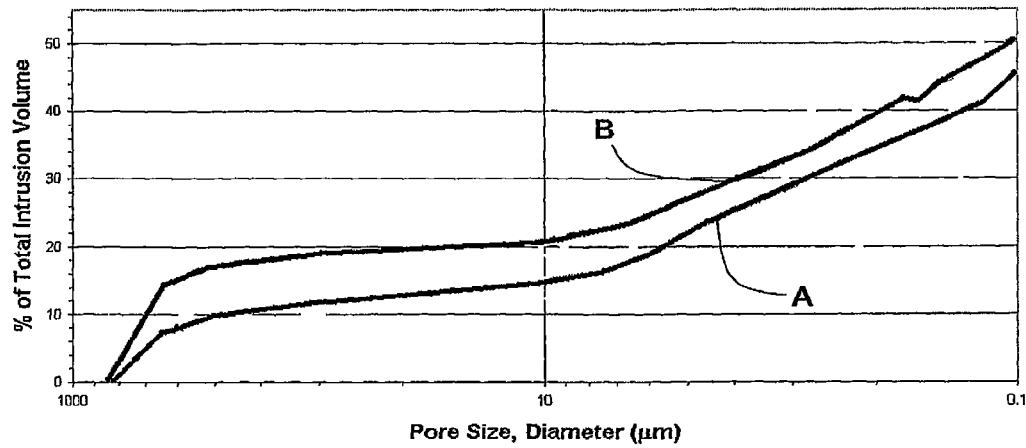
FIG. 1 is a graph showing a comparison of the intrusion volume of Example 1 material (line A) and of the Example 2 material (line B)

The agent may comprise at least one compound of manganese and iron and/or copper and/or zinc which are present in the weight or order range 8:1 to 1:8, preferably in the range 3:1 to 1:3, although all other inclusive ranges may be used. The inclusion of copper compounds or copper is beneficial because it will scavenge lower concentrations of sulphur compounds as well as arsine.

Compounds of copper may be present in the range of 5:1 to 1:5 (Cu:Mn) and zinc compounds may be present in the range of 5:1 to 1:5 (Zn:Mn).

The agent, e.g. the desulphurisation agent, may be in the form of an extrudate or granulate depending on the desired use. The form of the agent will be determined by the amount of liquid mixed with the components and the process of formation used.

Preferably, the pore forming particles are thermoplastic particles.

The use of thermoplastic spheres gives subsequently-fired ceramic extrudates pre-selected porosity and pore size. Because of the hydrophilic nature of the spheres these voids may be interconnected with the window sizes up to 30% of the sphere diameters. Preferably the thermoplastic spheres make up between about 5% and about 95% of the total volume of the paste, preferably between 10% and 30%. Suitable spheres are sold under the trade name EXPANCEL.

Where the agent is an extrudate, different or additional agents can be included in the paste to give the fired extrudates added porosity and pore structure. These additional or different pore forming agents can be categorised into three groups:
  Macroscopic structural pore formers.
  Microscopic pore structure modifiers, and
  Additional pore formers.

By macroscopic structural pore formers we mean additives which will provide channeled structure within the fired extrudates.

The strut size of this channel structure will be in the millimeter range between 0.5 and 10, or more preferably between 1 to 6 mm. These macroscopic structural pore formers can be selected from spherical materials such as expanded polystyrene beads, fibres of aspect ratio between 1 to 5 made from polymers or natural materials, and three-dimensional specially designed shapes such as reticulated polyurethane foam pieces and injection moulded thermoplastic spatial patterns.

By microscopic pore structure modifiers we mean the additives will provide morphological modification of the existing pores formed by other agents, say, thermoplastic spheres. The major function of the modification is to increase the specific surface area of the extrudates at the microscopic level by adding extra fine pores into the system. The pore size formed for this purpose is in the sub-micron range between 1 and 1000 nm, and more preferably between 50 and 800 nm. These microscopic structural pore modifiers can be selected from spherical materials such as latex suspensions, chemicals evolving gas at elevated temperatures such as aluminium hydroxide, calcium carbonate and magnesium carbonate. The additional pore formers may be natural organic materials such as ground almond shell, olive stone, coconut-shell, and the like. The materials are relatively cheaper than thermoplastic spheres and give off less environmentally hazardous emissions during firing.

Preferably, the at least one compound of manganese is selected from the oxide, hydroxide and/or carbonate (e.g. hydroxycarbonate).

The at least one compound of iron, copper or zinc may be selected from the oxide, hydroxide and/or carbonate (e.g. hydroxycarbonate).

The compounds may be used as the only components or there may be included a promoter such as a compound of an element selected from Groups 1A, 18, VA and VIII of the Periodic Table, for example one or more of potassium hydroxide nickel hydroxide and sodium hydroxide. The concentration of the promoter is preferably in the range of from 0 to about 10%.

Binders may also be present, for example cement, aluminium, days, silicates, organic binders and so on.

In particular the binders may be any substance suitable for the purpose of giving a high green strength of the granulates or extrudates once the liquid medium is removed. Examples of organic binders include polyvinyl alcohol, polyvinyl acetate, polyethylene glycol, polysaccharides, cellulose derivatives, agar, starches, flours and gelatins; other inorganic binders include kaolin, colloidal silica and colloidal alumina and fine aluminium hydroxides.

In another embodiment the binder may be a polymerisable monomer which on addition of the appropriate catalyst and initiator, polymerises to set the structure of the shaped product. A hydrophilic binder is preferable and one which can be reversibly dehydrated such that an active species can be dispersed in the monomer which after polymerisation and dehydration holds the active species in a dispersed form and may prevent reaction with for example oxygen, carbon dioxide etc by polymer coating and which on rehydration renders the active species available for reaction.

The polymerisable monomer may also be added to a preformed porous body with the sole function of holding dispersions of active species in the polymer coating on the surface and within the pores of the perform. On dehydration, at a temperature below which the dehydration is a reversible process, the polymer maintains the dispersion of active species in a controlled environment. On rehydration the active species become available for reaction/absorption. Alternatively the polymer is heated above the temperature for reversible hydration to a temperature at which the polymer is partially or fully carbonised so exposing the active species.

The thermoplastic particles are preferably spheres which may be solid, hollow or foamed with micro-porosity, the hollow thermoplastic spheres being most preferred. In the case of foamed thermoplastic spheres, the expansion ratio (size after expansion divided by size before expansion) should be in the range between 10 to 40, preferably between 20 and 30. To reduce the risk of chemical contamination of the products the composition of the thermoplastic spheres should be preferably free from alkali metals, phosphorous, calcium, magnesium, chlorine, sulphur, silicon, and other metal ions. From the environmental point of view the chemical composition of the thermoplastic-spheres should preferably be free from ammonia, chlorine, sulphur and other nitrogen containing amino-groups.

Both the performing particles, e.g. thermoplastic spheres, (and other agents) may be solution treated to coat an active chemical or chemicals onto their surface to locally modify the chemical or mineralogical composition of the fired porous extrudates. An active catalyst material or its precursor, e.g. salt, may be uniformly coated onto the filler surface and subsequently transferred onto the inner surface of the pores. A significant cost saving and a much more uniform catalyst deposition comparing with the traditional techniques, are thus obtained. Other active materials such as crystalline seeds, grain growth modifiers, chemicals, and fine ceramic particles of the same or different compositions of the matrix ceramic powder, may be incorporated into the solution either separately or in various combinations. These solution treatments will result in a fully or partially crystallised thin surface around the pores, example being amorphous silicate; a finer or coarser grain sizes within the surface layer of the pores, examples being abrasive ceramic foams and special dielectric components; and a thin surface coating of various chemical compositions and mineral phases, examples of which are highly corrosion resistant barns.

In a preferred feature the agent, e.g. desulphurisation agent, comprises shaped particles. The particles may be presented in a variety of shapes and sizes preferably as spheres; extrudates, granules, tablets or the like. The shaped material may require exposure to elevated temperatures to achieve the optimum bond strength.

The use of thermoplastic spheres is particularly advantageous in the preparation of catalysts and absorbents in that small extrudates, granules, rings, cylinders can be formed in a facile manner using granulation or low pressure extrusion techniques and on calcination of the shaped product the thermoplastic spheres decompose to form macropores within the overall porosity. The higher the addition of thermoplastic spheres to the original mix the higher the level of macroporosity. This has significant benefits in the utilisation of active catalyst/absorbent species on the inner pore surfaces of the shaped body.

The technique can be applied to catalysts and absorbents in which the bulk phase is based on metal oxides, hydroxides, carbonates etc particularly for use in purification processes such as desulphurisation of hydrocarbons, halide removal from gases and liquids, the removal of mercury and arsenic compounds from natural gas etc.

The macroporosity can be utilised for infiltration, partially or fully, by metallic species in the form of alloys such as silver. A silver infiltrated porous body may be used for the removal of mercury from gaseous streams by forming an amalgam with the silver. In another embodiment the shaped body is subject to temperatures at which the thermoplastic spheres undergo reversible dehydration. This has potential in reactions such as hydrolysis of COS or oxygen scavengers where the gas/liquid to be purified is water saturated and the purification process requires the presence of liquid water for the process to proceed.

The species may be used in a fixed bed, a fluid bed or a moving bed. The choice of the reactor system will depend on generated requirements and the nature of the gas stream, e.g. sour feed. Particle sizes of about 3 to about 6 mm are particularly useful in a fixed bed. In a fluid bed, the particle size is preferably in the range about 20 to about 120 µm, most preferably about 30 to about 100 µm.

For the moving bed, the particle size is preferably in the range about 120 to 600 µm, most preferably about 200 to about 500 µm.

The method of the invention may be enhanced by the incorporation of materials with sorption properties. Such materials may be added according to the physical form of the desulphurisation agent. They may be added on to the surface or within the pores of a porous desulphurisation agent or in the bulk phase. Such materials may be catalytically active. The materials (which may be included either singly or in combination) are preferably oxides, carbonates, silicates, phosphates of alkali metals, alkaline earths, rare earths, Zn, Co, Ni Mo, Cr, Cu, Ti Zr, Si Al, precious metals. The materials may be incorporated within the material of the invention by impregnation, deposition, coforming, precipitation techniques well known to those skilled in the art of catalyst preparation. The content of the sorption materials may range from about 0 to 40% by weight, preferably in the range 2 to 20% by weight.

In a preferred feature of the invention, other reagents are associated with the desulphurisation agent to react with other substances present in the stream to be treated at from about ambient to about 250° C. One such reagent is an alkaline reagent such as alkali metal hydroxide or silicate, the alkali metal is preferably sodium. Such an alkaline reagent will react with halides or strongly acidic gases present in the sour feed such as SOx to form halide or sulphide respectively (which may be recovered later). The reagents may be impregnated into the desulphurisation agent or incorporated into the bulk phase by other means well known to those skilled in the art of catalyst preparation.

The spent desulphurisation agent of the invention may be regenerated by exposure to an oxidising atmosphere e.g. air at elevated temperature. The presence of steam when regenerating may be beneficial.

In another aspect the method of the present invention includes the further step of exposing the spent agent to oxidation at elevated temperature to remove the sulphur compounds and regenerate the agent for re-use.

The sulphur compound to be removed may be hydrogen sulphide gas or a low molecular weight mercaptan such as propyl mercaptan. The hydrocarbon stream may be liquid or gas or both, examples being natural gas, town gas, industrial waste gas, coke oven gas, coal gas, liquid or gas from petroleum plant oil refinery. Effluent streams from biomass digesters, general industrial process may also be treated.

The method may be performed at pressures ranging from about atmospheric to about 100 atmospheres without adverse effect.

The desired species may be mixed according to the teachings of earlier prior art to form compositions for the use in removal of species from a diluent or process stream.

The effectiveness of these species is thought to be enhanced by the use of pore-forming particles which provide high levels of controlled macroporosity.

In order that the invention may be more fully understood reference is made to the accompanying examples.

EXAMPLE 1

The following composition was nixed

| | |
| --- | --- |
| MnO$_2$ | 4 (parts by weight) |
| ZnCO$_3$ | 3 |
| CUCO$_3$ | 2 |
| Thermoplastic Spheres | 0.1 |
| Binder | 0.6 |
| Water | 2.6 |

The resulting mixture was extruded at a low pressure (<0.4 MPa). The resulting extrudate was shaped and fired to provide particles of an agent having a diameter of 3 mm, a pore volume of 0.4-0.5 ml/g and a surface area>45 m$^2$/g. The material was effective in low temperature desulphurisation of gaseous and liquid hydrocarbon additives.

EXAMPLE 2

The following composition was mixed

| | |
| --- | --- |
| MnO$_2$ | 2 (parts by weight) |
| ZuCO$_3$ | 3 |
| CuCO$_3$ | 4 |
| Thermoplastic Spheres | 0.1 |
| Binder | 0.6 |
| Water | 2.6 |

The resulting mixture was extruded, shaped and fired to provide particles of an agent having a diameter of 3 mm, a pore volume of 0.45-0.5 ml/g and a surface area of >45 m$^2$/g.

The material was used in low temperature desulphurisation of gaseous and liquid hydrocarbon feed stocks.

FIG. 1 provides a comparison of the intrusion volume of Example 1 material (line A) and of the Example 2 material (line B).

To show the effectiveness of the two species a series of experiments were conducted to determine the species' ability to remove sulphur from a propane process stream.

Figure 2:
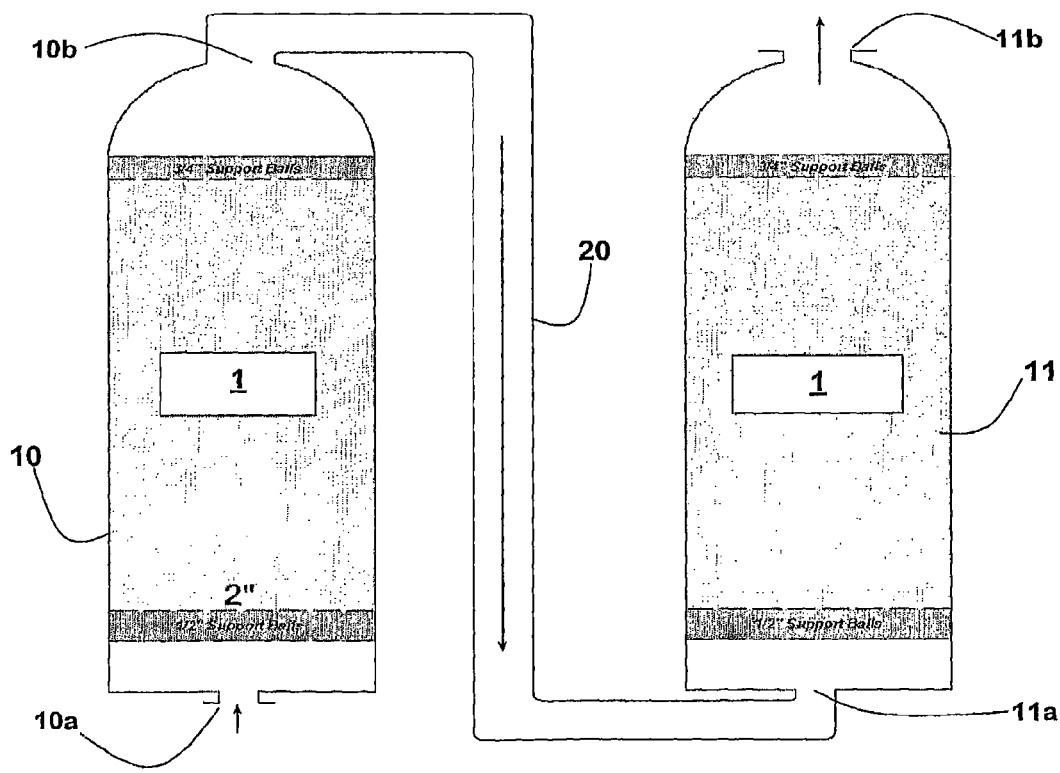
FIG. 2 is a schematic representation of the apparatus used.

FIG. 2 provides a schematic representation of the apparatus used, wherein the material 1 is packed into two tanks 10, 11, the outlet 10h of the first tank 10 being connected by conduit 20 to the net 11a of the second tank 11.

Gas to be treated is directed into the net 10a of the first tank 10, through the material 1 and then via the outlet 10b and conduit 20 to the inlet 21a of the second tank 11 where it travels through the material 1 before exiting the tank 21 via outlet 11b, whereupon it is analysed by gas chromatography.

Figure 3:
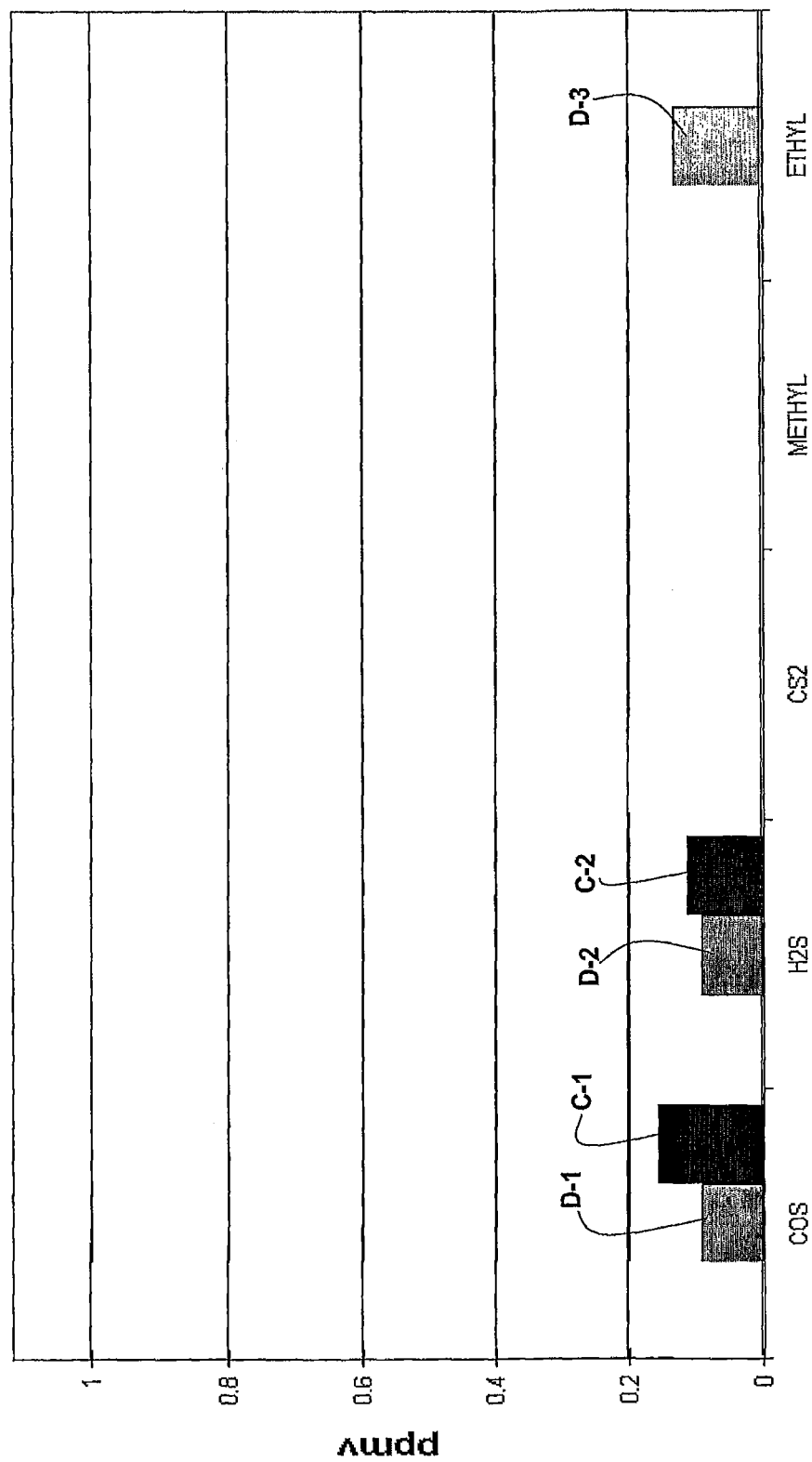
FIG. 3 is a graph showing the performance of the various materials.

FIG. 3 provides a graph showing the performance of the various materials for a 10 minute contact time with the propane diluent, where the data indicated by C-1, C-2 and C-3 relates to the material of Example 1, the data indicated by D-1, D-2 and D-3 relates to the material of Example 2.

Clearly, a number of different materials may be used together, or in isolation.

The results show that significant amounts of the sulphur-containing species were removed.

The effectiveness of these species is thought to be enhanced by the use of pore-forming particles which provide high levels of controlled macroporosity.

While the invention has been described in detail and with reference to specific embodiments thereof, it will be apparent to one skilled in the art that various changes and modifications can be made therein without departing from the spirit and scope thereof.

The invention claimed is:

1. A desulphurisation agent, comprising:
   pore forming particles;
   at least one compound of manganese; and
   at least one compound of copper.

2. The agent of claim 1, further comprising:
   at least one of a compound of iron and a compound of zinc.

3. The agent of claim 1, wherein a ratio of the compound of manganese to the compound of copper is between 8:1 and 1:8 by weight.

4. The agent of claim 1, wherein a ratio of the compound of manganese to the compound of copper is between 3:1 and 1:3 by weight.

5. The agent of claim 2, wherein a ratio of the compound of manganese to the compound of iron is between 8:1 and 1:8 by weight.

6. The agent of claim 2, wherein a ratio of the compound of manganese to the compound of iron is between 3:1 and 1:3 by weight.

7. The agent of claim 2, wherein a ratio of the compound of manganese to the compound of zinc is between 8:1 and 1:8 by weight.

8. The agent of claim 2, wherein a ratio of the compound of manganese to the compound of zinc is between 3:1 and 1:3 by weight.

9. The agent of claim 1, wherein the pore forming particles comprise at least one of thermoplastic particles and thermoplastic spheres.

10. The agent of claim 1, wherein the pore forming particles comprise hollow particles.

11. The agent of claim 1, where in the pore forming particles comprise at least one of spheres, extrudates, granules, and tablets.

12. The agent of claim 1, wherein pore forming particles comprise between 5% and 95% of a total volume of the agent.

13. The agent of claim 1, wherein pore forming particles comprise between 10% and 30% of a total volume of the agent.

14. The agent of claim 1, wherein the compound of manganese comprises at least one of an oxide, a hydroxide, and a carbonate.

15. The agent of claim 1, wherein the compound of copper comprises at least one of an oxide, a hydroxide, and a carbonate.

16. The agent of claim 2, wherein the compound of iron comprises at least one of an oxide, a hydroxide, and a carbonate.

17. The agent of claim 2, wherein the compound of zinc comprises at least one of an oxide, a hydroxide, and a carbonate.

* * * * *